United States Patent Office 3,444,163
Patented May 13, 1969

3,444,163
THIOACRYLIC DERIVATIVES
Edgar J. Smutny, San Francisco, Calif., assignor to Shell Oil Company, New York, N.Y., a corporation of Delaware
No Drawing. Filed Feb. 21, 1966, Ser. No. 528,808
Int. Cl. C09b *23/04;* C10m *1/38;* A01n *9/12*
U.S. Cl. 260—240
12 Claims

ABSTRACT OF THE DISCLOSURE

Certain novel dithioacrylate and thioacrylamide derivatives of dithioacrylic acid, useful as herbicides and as monomers in processes of polymerization and copolymerization, are produced by the reaction of 5-hydrotrithionium salts with certain nitrogen-containing bases.

---

This invention relates to an improved method for the production of certain derivatives dithioacrylic acid and to the novel products produced thereby.

An extensive discussion of the chemistry of 1,2-dithiole-3-thiones, herein termed trithiones, is provided by Landis, Chem. Revs., 65, 237 (1965), and the references cited therein. The class of trithiones is represented by the general formula provided below.

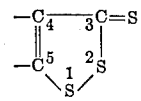

wherein the numerals indicate the relative positions of the ring atoms. It is well known that trithiones undergo reaction with alkyl halides, sulfates, perchlorates and the like to form corresponding trithionium salts such as are represented by the formula

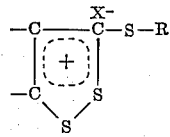

wherein A is an alkyl group, X⁻ is an anion and the dotted line designation represents a delocalized electron system indicating in summation the various resonance forms of the trithionium cation. According to the disclosure of Landis, trithionium salts containing hydrocarbyl substituents upon the ring carbon atom numbered 5 or upon the ring carbon atoms numbered 4 and 5 undergo reaction with a variety of nitrogen bases to form dithioimides. For example, reaction of a 5-phenyltrithionium salt with aniline results in the formation of N-phenyl-5-phenyl-1,2-dithiole-3-imide. However, little is known relative to the reaction of nitrogen bases with salts of the simplest member of the class, trithione, or with salts of trithione derivatives having a hydrogen substituent on the number 5 ring atom.

It is an object of the present invention to provide an improved process for the production of certain derivatives of dithioacrylic acid and the novel products produced thereby. More particularly, it is an object to provide a process for the production of novel dithioacrylate and thioacrylamide derivatives by reaction of certain 5-hydrotrithionium salts with certain nitrogen-containing bases.

It has now been found that these objects are accomplished by the process of reacting a 5-hydro-1,2-dithiole-3-thione, i.e., a 5-hydrotrithione, with an amine having at least one hydrogen substituent on the nitrogen atom thereof. Although the mechanism of the process is not known with certainty, the reaction of the amine with the 5-hydrotrithionium salt results in the opening of the trithione ring to produce derivatives of the three-carbon trithione residue incorporating sulfur as a portion of a dithiocarboxy group or of a thiocarboxamide group.

The process of the invention comprises the reaction of an organic amine of at least one hydrogen substituent on the nitrogen atom thereof, i.e., a primary or secondary amine, with an S-substituted trithionium salt having a hydrogen substituent on the number 5 ring atom. One class of such S-substituted 5-hydrotrithionium salts is represented by the formula

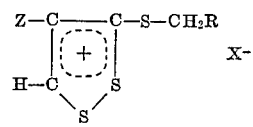

wherein Z is hydrogen, hydrocarbyl or cyano, R represents hydrogen or an organic amine, X is a monovalent anion and the dotted line designation indicates a delocalized electron system representing generically the various resonance forms of the positively-charged trithionium moiety. In an alternate but equivalent method of representation, the S-substituted trithionium salt is represented by the formula

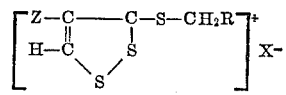

wherein Z, R and X have the previously stated significance.

The substituent Z as defined above is hydrogen, hydrocarbyl or cyano. When Z is hydrocarbyl it is preferred that the Z group is hydrocarbyl free from aliphatic unsaturation having up to 12 carbon atoms. Illustrative of suitable hydrocarbyl Z groups are alkyl groups such as methyl, ethyl, propyl, butyl, octyl, decyl, and cyclohexyl; aralkyl groups such as benzyl and β-phenylethyl; aryl groups such as phenyl and naphthyl; and alkaryl groups such as p-tolyl, 2,4-xylyl and p-tert-butylphenyl. A preferred class of hydrocarbyl Z groups comprises methyl, phenyl and tert-butyl. Largely because of the ease of preparation thereof, however, the preferred reactants are those having a Z substituent which is hydrogen, i.e., the preferred trithionium salt reactant is a salt of trithione.

When the R moiety is not hydrogen, R is an organic group free from acetylenic unsaturation. Although R groups which incorporate nonreactive substitutents such as halo, cyano and the like are suitable, in the preferred modification of the invention R is hydrogen, hydrocarbyl, carbohydrocarbonoxy or acyl. Illustrative hydrocarbyl R groups are hydrocarbyl of up to 12 carbon atoms including alkyl groups such as methyl, ethyl, propyl, sec-butyl, tert-amyl, octyl, decyl, cyclohexyl, 3-methylcyclopentyl and octyl; alkenyl groups such as vinyl, allyl, crotyl and cyclohexenyl; aralkyl groups such as benzyl, 2-phenylethyl and 3-phenylbutyl; aryl groups such as phenyl and naphthyl; and alkaryl groups as p-tolyl, m-propylphenyl, 2,4-dimethylphenyl and p-tert-butylphenyl. Illustrative carbohydrocarbonoxy groups have up to 12 carbon atoms and include carbomethoxy, carbethoxy carbobutoxy, carbophenoxy and carbohexoxy; and illustrative acyl groups are acyl of up to 12 carbon atoms such as acetyl, propionyl, hexanoyl, benzoyl and dodecanoyl. When R is other than hydrogen, acyclic alkyl R groups of up to 4 carbon atoms comprise a preferred class. Best results are obtained, however, when R is hydrogen.

The term X⁻ in the above formula represents a monovalent anion associated with the S-substituted trithionium cation. The nature of the anion moiety of the salt reactant is not critical and satisfactory results are obtained through utilization of a wide variety of anion moieties. Illustrative of suitable monovalent anions are halide, particularly halide of an atomic number from 17 to 53, i.e., chloride, bromide or iodide, alkylsulfate, particularly alkylsulfate wherein the alkyl group is alkyl of up to 4 carbon atoms, perchlorate, iodate, dialkylphosphate or the like. The preferred class of anions are sterically large anions such as perchlorate, alkylsulfate and iodide, and particularly useful as a reactant is an alkylsulfate salt.

The S-substituted trithionium salt is reacted with an organic amine of at least one but no more than two hydrogen substituents on the amino nitrogen atom, with the remaining valence(s) of the nitrogen being satisfied by bonding to at least one organic substituent. One class of such amines is represented by the formula

wherein R' is a monovalent organic radical of up to 20 carbon atoms, preferably of up to 10, and R" is hydrogen or R', with the proviso that R' and R" may together represent a divalent moiety which together with the nitrogen atom to which it is bonded form a heterocyclic ring.

In the modification wherein R' is monovalent, suitable R' groups are free from aliphatic unsaturation and contain no acidic hydrogen atoms. Although the process of the invention is operable when the R' substituent is of relatively simple or of comparatively complex structure, best results are obtained when the R' substituent is hydrocarbon containing only atoms of carbon and hydrogen or is halohydrocarbon additionally containing from 1 to 4 atoms of halogen, preferably halogen of atomic number from 17 to 35, i.e., the middle halogens chlorine and bromine. This class of R' substituents, generically designated (halo)hydrocarbon, preferably is (halo)hydrocarbon of up to 4 halogen substituents.

In the modification wherein R' and R" together form a divalent moiety the divalent moiety considered as a whole is a divalent radical of up to 20 carbon atoms, of up to 4 halogen substituents, preferably of atomic number from 17 to 35, and up to 1 atom of oxygen which oxygen atom, if present, is incorporated into a heterocyclic ring formed by the divalent radical and the amino nitrogen atom to which it is attached of from 5 to 8 total heterocyclic ring atoms.

Illustrative of amine reactants wherein R' and R" are each monovalent are primary amines such as methylamine, ethylamine, sec-butylamine, laurylamine, 2-ethylhexylamine, benzylamine, 2-phenylethylamine, cyclohexylamine, cyclopentylamine, hexadecylamine, aniline, p-tert-butylaniline, 2,5-dichloroaniline, 4-bromoaniline, 3,4,6-trichlorocyclooctylamine, 4-bromobutylamine and 8-chlorodecylamine; and secondary amines such as dimethylamine, dipropylamine, methyloctylamine, propyldodecylamine, N-methylaniline, diphenylamine, benzylphenylamine, N-butyl - 2,4 - dichloroaniline, dicyclohexylamine, bis(2-chloro-4-methylphenyl)amine and cyclopentylmethylamine. Illustrative of amine reactants wherein R' and R" together form a divalent moiety are pyrrolidine, piperidine, morpholine, 3-(chloromethyl)-pyrrolidine, 2,4-dimethylpiperidine and 3-bromopyrrolidine. In general, amine reactants which are hydrocarbon amines are preferred over other analogous amines and particularly preferred are those hydrocarbon amines wherein R' and R" are each monovalent.

The process of the invention is conducted in the liquid phase in the presence of or in the substantial absence of added reaction diluent. In one modification of the process, an excess of the amine reactant is employed so that the amine serves as reaction diluent as well as a reactant. In the modification wherein added reaction diluent is employed, suitable diluents are those diluents which are liquid under the reaction conditions and which are inert to the reactants of the invention and the products resulting therefrom. Illustrative of suitable diluents are ethers including dialkyl ethers such as diethyl ether, dibutyl ether and methyl hexyl ether, cyclic ethers such as tetrahydrofuran, dioxane and dioxolane, and lower alkyl ethers (full) of polyhydric alcohols and poly(oxyalkylene) glycols such as 1,2-dimethoxyethane, diethylene glycol dimethyl ether and glycerol triethyl ether; nitriles such as acetonitrile, propionitrile and benzonitrile; and sulfones and sufoxides such as diethyl sulfone, dimethylsulfoxide, methyl butyl sulfone and dipropylsulfoxide. The amount of reaction diluent, when employed, is not critical and utilization of up to about 50 moles of diluent per mole of reactants is satisfactory.

The molar ratio of the amine to the trithionium salt is of some importance as the reactant ratio will in part determine the type of product that is produced. Broadly speaking, it is preferred to employ a molar amount of the amine that is equivalent to or in excess over the molar amount of the trithionium salt, that is, a molar ratio of amine to the trithionium salt of at least 1:1. Although there is no critical maximum molar ratio of amine to the trithionium salt, and in the modification wherein excess amine is employed as reaction diluent considerable excesses of amine are frequently employed, molar ratios of amine to the trithionium salt of from about 1:1 to about 20:1 are satisfactory with best results being obtained when a molar ratio of from about 1:1 to about 10:1 is employed.

When the molar ratio of the amine to the trithionium salt is relatively limited, e.g., when a molar ratio of from about 1:1 to about 3:1 is utilized, the production of products incorporating one moiety of the amine and one moiety of the trithionium salt is favored. These products are esters of dithioacrylic acid which are substituted on the beta carbon atom thereof by a moiety of the amine reactant. In terms of the preferred amine and trithionium salt reactants as defined above, these dithioacrylate derivatives are represented by the formula

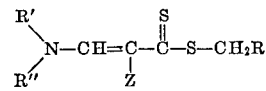

wherein Z, R, R' and R" have the previously stated significance. Illustrative of such dithioacrylate products are methyl 3-(dimethylamino)dithioacrylate, ethyl 3-anilinodithioacrylate, benzyl 3-(benzylamino)dithioacrylate, butyl 3-morpholinodithioacrylate, methyl 3-(2,4-dichloroanilino)dithioacrylate and ethyl 3-cyano-3-ethylaminoacrylate.

Alternatively, when the amine reactant is employed in substantial excess over the trithionium salt, e.g., a molar ratio of at least 3:1, the production of products incorporating two moieties of the amine and one moiety of the trithionium salt is favored. These products are triacrylamides incorporating an amine residue as the amine moiety as well as a beta substituent. In terms of the preferred amine and trithionium salt reactants as defined above, the thioacrylamide products are represented by the formula

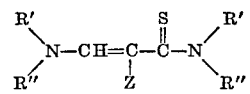

wherein Z, R' and R" have the previously stated significance. Illustrative of such thioacrylamide products are N,N-dimethyl - 3 - (dimethylamino)thioacrylamide, N-phenyl-3-anilinothioacrylamide, 3-morpholino - 3 - cyanothioacrylmorpholinamide and N-butyl-3-(butylamino)-thioacrylamide.

The mechanism of the process of thioacrylamide production is not understood with certainty, but it is considered likely that initial reaction of the amine and the trithione salt results in the formation of the above depicted dithioacrylate product which subsequently reacts with additional amine to form the above-depicted thioacrylamide product. Thus, by control of the reactant ratio it is possible to produce a product comprising essentially either of the above product types. Alternatively, it is possible to initially prepare the dithioacrylate derivative and subsequently effect reaction with additional amine in a separate operation.

In any modification, the reaction of amine and the trithionium salt is effected at moderate temperature and pressure. Reaction temperatures from about 10° C. to about 100° C. are satisfactory with the temperature range from about 20° C. to about 70° C. being preferred. The pressure at which the process is conducted is not critical so long as the reactants are maintained substantially in the liquid phase. Pressures that are substantially atmospheric are preferred, e.g., pressures from about 0.5 atmosphere to about 5 atmospheres, although higher or lower pressure may be employed. The method of reactant contacting may be varied. In one modification, the entire amounts of reactants are charged to an autoclave or similar reactor and maintained at reaction temperature until reaction is complete. Alternatively, one reactant may be added to the other in increments as by adding at least a portion of the amine in increments to a solution of the trithionium salt. In yet another modification, the reaction is conducted in a continuous manner as by contacting the reactants during passage through a tubular reactor.

Subsequent to reaction, the product mixture is separated and the thioacrylic products are recovered by conventional means such as fractional crystallization, selective extraction, filtration, distillation and the like.

The products of the invention find utility in a number of applications. In one aspect, the thioacrylic products are useful as agricultural chemicals, particularly as herbicides, being effective in the control of crabgrass. In an alternate application, the ethylenically unsaturated products are useful as monomers in processes of polymerization or copolymerization, which processes are conducted by methods employed for polymerization of acrylic materials, e.g., acrylate esters. Copolymers of the thioacrylic products of the invention with other monomers such as N-vinylpyrrolidone are useful as lube oil additives and the like.

To further illustrate the improved process of the invention and the novel products threby produced, the following examples are provided. It should be understood that the details thereof are not to be regarded as limitations, as they may be varied as will be understood by one skilled in this art.

EXAMPLE I

To a solution of 5.0 g. of morpholine in 20 ml. of dimethylsulfoxide was added 6.0 g. of the dimethyl sulfate salt of trithione. The temperature of the reaction mixture rose rapidly to 50° C., whereupon the reaction mixture was cooled in an ice bath to 40° C. and then stirred until the temperature returned to room temperature. The mixture was subsequently cooled to 0° C. and the precipitate which had formed was removed by filtration. A second crop of crystals was obtained by diluting the filtrate with ethanol and subsequent to the removal thereof, a third crop of crystals was obtained by flooding the filtrate with water. The combined precipitate was recrystallized from methanol to afford 4.68 g. of a bright yellow product, methyl 3-morpholinodithioacrylate, M.P. 136.5–138° C., in a yield which was 92% of theoretical. The structure of the product was confirmed by mass spectrometric analysis and the nuclear magnetic resonance spectrum was consistent with the above structure. The product had the following elemental analysis:

Analysis.—Calculated (percent wt.): C, 47.3; H, 6.41; N, 4.90; S, 31.5. Found: C, 47.1; H, 6.5; N, 6.0; S, 31.0.

By a similar procedure, morpholine reacts with the dimethyl sulfate salt of 4-cyanotrithione to produce a good yield of methyl 2-cyano-3-morpholinodithioacrylate, M.P. 158–159° C.

EXAMPLE II

The procedure of Example I was followed to contact 3.0 g. of the dimethyl sulfate salt of trithione with 2.15 g. of aniline. In this experiment, the temperature rose only to 35° C. and no external cooling was provided. The sole precipitate which formed was found to be sulfur and after the removal thereof by filtration the desired product was obtained by diluting the filtrate with water. The orange oil which initially formed crystallized rapidly and was filtered from the liquid phase and recrystallized from a benzene-light petroleum fraction mixture. The yield of orange crystals, methyl 3-anilinodithioacrylate, M.P. 86.6–87.6° C., was 1.8 grams, which represented a yield of 75.5%. The structure of the product was confirmed by mass spectrometric analysis and the product had the following elemental analysis.

Analysis.—Calculated (percent wt.): C, 57.5; H, 5.27; N, 6.71. Found: C, 57.2; H, 5.4; N, 6.52.

EXAMPLE III

By a procedure similar to that of Example I, 3.94 g. of piperidine was contacted with 6.0 g. of the dimethyl sulfate salt of trithione. The product began to crystallize after a short reaction period and when reaction appeared to be complete, the precipitate was removed by filtration. A second crop of crystals was obtained by flooding the filtrate with water. The combined precipitates were recrystallized from ethanol to give a 45% yield of methyl 3-piperidinodithioacrylate, M.P. 118–122° C., which had the following elemental analysis.

Analysis.—Calculated (percent wt.): C, 53.8; H, 7.47; N, 6.97. Found: C, 53.3; H, 7.6; N, 6.81.

EXAMPLE IV

The procedure of Example III was employed to react 9.7 g. of 3,4-dichloroaniline wth 7.86 g. of the dimethyl sulfate salt of trithione. The yellow crystalline product methyl 3-(3,4-dichloroanilino)dithioacrylate, M.P. 156–157° C., was obtained in 33% yield and had the following elemental analysis.

Analysis.—Calculated (percent wt.): C, 43.2; H, 4.24; N, 5.04. Found: C, 42.5; H, 3.4; N, 4.63.

EXAMPLE V

To a solution of 6.0 g. of the dimethyl sulfate salt of trithione in 20 ml. of dimethylsulfoxide at 17° C. was added 1.03 g. of dimethylamine. The reaction mixture became deep red, rose slightly in temperature and a flocculant precipitate was formed. An additional 0.5 g. of dimethylamine was added, the precipitate was removed by filtration and the filtrate was added to an excess of water. A crystalline product was formed which was removed and recrystallized from a benzene-light petrolum fraction mixture. A second recrystallization from ethanol afforded 1.0 g. of yellow crystalline product, methyl 3-(dimethylamino)dithioacrylate, M.P. 101–103° C., which represented a yield of 27%. The product had the following elemental analysis.

Analysis.—Calculated (percent wt.): C, 44.7; H, 6.84; N, 8.70. Found: 44.8; H, 7.0; N, 8.54.

EXAMPLE VI

To a solution of 3.26 g. of aniline in 25 ml. of ethanol was added 5.35 g. of the benzyl bromide salt of trithione. When product began to precipitate, additional ethanol was added and the mixture was warmed gently until it became homogeneous. The solution was then filtered and cooled and the product which had precipitated was recrystallized from ethanol. A second recrystallization from benzene gave 1.5 g. of benzyl 3-anilinodithioacrylate, M.P. 120–122° C., which had the following elemental analysis.

Analysis.—Calculated (percent wt.): C, 54.4; H, 7.47. N, 4.92; S, 22.5. Found: C, 66.5; H, 5.5; N, 4.67; S, 22.3.

EXAMPLE VII

In 48 ml. of pyrrolidine was dissolved 2.00 g. of the methyl perchlorate salt of trithione. The resulting solution was allowed to stand at ambient temperature for two weeks, after which the excess pyrrolidine was removed by distillation at reduced pressure and the amine salt was removed by extracting the other products into a chloroform-ether mixture. The extract was distilled at reduced pressure to remove solvent and the oil which remained was crystallized from ether to yield 1.1 g. of a yellow solid which was extracted with acetone. The acetone was removed at reduced pressure to afford a solid product which was recrystallized from ether. A yield of 0.3 g. of product, the pyrrolidinamide of 3-pyrrolidinothioacrylic acid, M.P. 109–110° C., was obtained. The structure of the product was confirmed by mass spectrometric analysis and the nuclear magnetic resonance spectrum of the product was consistent with the above structure. The product had the following elemental analysis.

*Analysis.*—Calculated (percent wt.): C, 62.9; H, 8.57; N, 13.3; S, 15.2. Found: C, 61.1; H, 9.4; N, 13.7; S, 15.4.

EXAMPLE VIII

In 8 ml. of morpholine was dissolved 1.00 g. of methyl 3-morpholinodithioacrylate and the mixture was allowed to stand at ambient temperature for two days. The solvent was then removed at reduced pressure and the semi-solid residue was recrystallized from a benzene-light petroleum fraction mixture. The 1.00 g. of product, the morpholinamide of 3-morpholinothioacrylic acid, M.P. 147.5–148.5° C., represented an 84% yield. The structure of the product was confirmed by mass spectrometric analysis and the nuclear magnetic resonance spectrum of the product was consistent with the above structure. The product had the following elemental analysis.

*Analysis.*—Calculated (percent wt.): C, 54.4; H, 7.47. Found: C, 54.9; H, 8.0.

EXAMPLE IX

By the procedure of Example I, morpholine is reacted with a variety of S-substituted trithionium salts to produce esters of 3-morpholinodithioacrylic acid. Illustrative of such esters are the following:

(1) Allyl 3-morpholinodithioacrylate, M.P. 91–94° C.
(2) Carbethoxymethyl 3-morpholinodithioacrylate, M.P. 81–82° C.
(3) Benzoylmethyl 3-morpholinodithioacrylate, M.P. 137–138° C.

EXAMPLE X

A procedure similar to that of Example I was followed to contact 1.35 g. of methyl iodide salt of 4-phenyltrithione with 0.84 g. of morpholine in 10 ml. of dimethylsulfoxide. The product, methyl 3-morpholino-2-phenyldithioacrylate, M.P. 126–128° C., was obtained in a yield of 1 g. The product had the following elemental analysis.

*Analysis.*—Calculated (percent wt.): C, 60.1; H, 6.3; N, 5.1. Found: C, 60.1; H, 6.1; N, 5.0.

EXAMPLE XI

A procedure similar to that of Example I was followed to contact 3.5 g. of the methyl iodide salt of 4-methyltrithione and 3.8 g. of morpholine in 20 ml. of dimethylsulfoxide. The product was methyl 3-morpholino-2-methyldithioacrylate, M.P. 102–104° C., which had the following elemental analysis.

*Analysis.*—Calculated (percent wt.): C, 49.7; H, 7.0; N, 6.2. Found: C, 49.8; H, 7.0; N, 6.5.

The infrared spectrum of the product was consistent with the above structure.

I claim as my invention:

1. The process of producing a thioacrylic product which comprises intimately contacting (a) an S-substituted trithionium salt of the formula

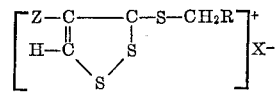

wherein Z is hydrogen, cyano or hydrocarbyl of up to 12 carbon atoms, R is hydrogen, hydrocarbyl of up to 12 carbon atoms, carbohydrocarbonoxy of up to 12 carbon atoms or hydrocarbyl acyl of up to 12 carbon atoms and X is a monovalent anion; and (b) an amine of the formula

wherein R' is (halo)hydrocarbyl free from aliphatic unsaturation of up to 20 carbon atoms and up to 4 halogen atoms and R'' is hydrogen or R', with the proviso that R' and R'' may together form a divalent radical which with the amino nitrogen atom forms a heterocyclic morpholine, piperidine, or pyrrolidine ring;

in the liquid phase at a temperature of from about 10° C. to about 100° C.

2. The process of claim 1 wherein the amine is morpholine.

3. The process of claim 1 wherein R is alkyl of up to 4 carbon atoms and Z is hydrogen.

4. The process of claim 3 wherein R' is monovalent hydrocarbyl free from aliphatic unsaturation of up to 10 carbon atoms.

5. The process of claim 4 wherein the amine is aniline.

6. The process of claim 4 wherein the amine is dimethylamine.

7. The thioacrylic compound selected from the compounds of the formula

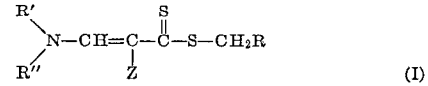

and

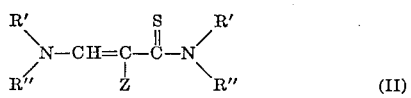

wherein Z is hydrogen, cyano or hydrocarbyl of up to 12 carbon atoms, R is hydrogen, hydrocarbyl of up to 12 carbon atoms, carbohydrocarbonoxy of up to 12 carbon atoms or hydrocarbyl acyl of up to 12 carbon atoms, R' is (halo)hydrocarbyl free from aliphatic unsaturation of up to 20 carbon atoms and up to 4 halogen atoms, and R'' is hydrogen or R', with the proviso that R' and R'' may together form a divalent radical which with the amino nitrogen atom forms a heterocyclic morpholine, piperidine, or pyrrolidine ring.

8. The compound of claim 7 represented by the formula

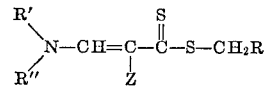

and wherein R is hydrogen or alkyl of up to 4 carbon atoms and Z is hydrogen.

9. The compound of claim 8 wherein R is hydrogen, R' is phenyl and R'' is hydrogen.

10. The compound of claim 7 represented by the formula

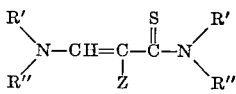

and wherein R' is monovalent hydrocarbyl free from aliphatic unsaturation of up to 10 carbon atoms and Z is hydrogen.

11. The compound of claim 7 represented by the formula

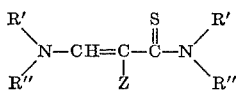

and wherein Z is hydrogen and each

moiety is morpholino.

12. The compound of claim 7 represented by the formula

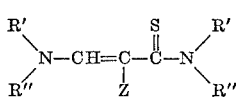

and wherein Z is hydrogen and each

moiety is pyrrolidino.

References Cited

UNITED STATES PATENTS 2,489,094  11/1949  Levesque _____ 260—326.83 XR
2,744,898  5/1956   Harman et al. __ 260—293.4 XR
3,248,400  4/1966   Flieg et al. _____ 260—246 XR HENRY R. JILES, *Primary Examiner.*

JOHN M. FORD, *Assistant Examiner.*

U.S. Cl. X.R.

71—94, 95, 100, 101; 252—47; 260—327, 455, 551, 78, 79.7, 247.1, 293.4, 326.3, 326.62, 326.83, 326.84, 465, 465.4, 465.5